United States Patent Office 3,347,852
Patented Oct. 17, 1967

3,347,852
PROCESS FOR REFINING CRUDE LACTAMS
Mitsuo Ishikawa, Shijyo-machi, Shunsuke Yonehara, Mizuho-ku, Nagoya, and Takanobu Godo, Komaki-shi, Aichi-ken, Japan, assignors to Toyo Rayon Kabushiki Kaisha, Tokyo, Japan, a corporation of Japan
No Drawing. Filed June 29, 1964, Ser. No. 378,999
Claims priority, application Japan, July 3, 1963, 38/34,310
11 Claims. (Cl. 260—239.3)

The present invention relates to a process for refining a crude lactam, more particularly to a process for refining a crude lactam, characterized by treating the crude lactam with liquid ammonia by at least one means of extraction and recrystallization processes. In general a lactam has been refined industrially by subjecting oxime to the Beckmman's rearrangement, but the lactam thus produced contains various sorts of impurities.

The lactam is polymerized to a polyamide which is an important material for the production of synthetic fibers and synthetic resins.

However, the polyamide product produced by polymerizing such a crude lactam as it is which has been obtained by subjecting oxime to the Beckmman's rearrangement, is inferior in its quality, and for this reason, refining of the crude lactam is essential.

Therefore, there have been proposed three methods for refining a crude lactam, namely, refining the crude lactam by distillation, extraction and by recrystallization.

In order to refine the crude lactam by extraction, the following practical processes have been proposed.

(1) Process wherein lactam is extracted with the use of a chlorinated hydro-carbon, such as trichlene and chloroform. (U.S. Patent No. 2,737,511 and U.S.S.R. Patent No. 66,682.)

(2) Process wherein lactam is extracted with the use of a hydro-carbon, such as benzene and n-heptane. (British Patent No. 841,383 and Dutch Patents No. 69,195 and No. 81,037.)

(3) Process wherein an organic solvent layer in which ε-caprolactam is extracted is subjected to oxidation treatment with the use of an oxidizing agent such as potassium permanganate. (British Patent No. 763,953.)

(4) Process wherein, after subjecting oxime to the Beckmman's rearrangement, crude lactam is partially neutralized with ammonia, followed by extraction of the lactam in the acidic range of pH below 5.0 to keep the amount of ε-caprolactam transferring into the organic solvent layer to a minimum, thereby preventing the impurities from mixing in the lactam. (British Patent No. 856,968.)

(5) Process wherein ε-caprolactam which has previously been extracted with an organic solvent is extracted with water. (German Patent No. 12,386.)

Further the following processes are known as a process for refining a crude lactam by means of recrystallization.

(1) Process wherein crude ε-caprolactam is recrystallized with water. (U.S. Patent No. 2,813,858 and Swiss Patent No. 317,460.)

(2) Process wherein crude ε-caprolactam is recrystallized with heptane. (U.S. Patent No. 2,861,988.)

(3) Processes wherein crude ω-lauryllactam is recrystallized with cyclohexane. (Ind. Eng. Chem. 53 826 (1961).)

(4) Process wherein crude ω-lauryllactam is recrystallized with ethyl acetate. (Japanese Patent Application Publication No. 81/1962.) The impurities contained in the crude lactam may be effectively removed by the distillation method. However, it has been an established fact that a pure lactam cannot be obtained advantageously industrially by mere distillation of the crude lactam without a preparatory refining operation. It is also known that the lactam is deteriorated when it is subjected to heat or light. Therefore it may be possible for the pure lactam in a crude lactam to be deteriorated during heat distillation of the crude lactam.

In this view, a process for the production of a pure lactam solely by distillation of the crude lactam is not advantageous as yet from the industrial view point.

On the other hand, the extraction method and recrystallization method which have been employed conventionally are not necessarily satisfactory for the production of a pure lactam on an industrial scale.

This is because the physical properties of the impurities in the crude lactam are closely resembled to those of the lactam and therefore the impurities cannot easily be removed from the lactam with the use of a common organic solvent.

It is, therefore, the object of the invention to provide a method for separating the pure lactam from a crude lactam advantageously on an industrial scale.

The inventors had conducted a long research work for a solvent capable of selectively separating the impurities from a lactam with the finding that, of all liquefied gases, liquid ammonia was most effective, which is relatively easy in handling. The present invention having been attained on the basis of said discovery is, therefore, a process for refining a crude lactam, which is characterized by treating the crude lactam with liquid ammonia by at least one means of the extraction process and the recrystallization process.

The practical method for the liquid ammonia treatment includes the extraction operation and recrystallization operation. Said process includes a process wherein the extraction and recrystallization operations are combined.

The extraction operation includes the operation comprising contacting an anhydrous crude lactam directly with liquid ammonia, thereby extracting the impurities in the liquid ammonia and the operation comprising, after having the crude lactam dissolved in an organic solvent, contacting the crude lactam with liquid ammonia, followed by separation of the impurities by means of liquid-liquid extraction. The process for refining a crude lactam of the invention is, therefore, much distinct from the conventional ones in respect that in the former, the impurities are separated from the crude lactam by dissolving them in liquid ammonia, whereas in the latter, the impurities are separated from the crude lactam by extracting the pure lactam from the crude lactam with the use of a solvent.

The recrystallization operation may be performed easily, taking advantage of difference in solubility of lactams in liquid ammonia. The recrystallization operation in the present invention, using liquid ammonia, is advantageous over those having been used heretofore in respect to the following.

(1) Liquid ammonia, because of its low boiling point, relatively greater evaporation latent heat and of its property that the pressure may easily be elevated by heating slightly, permits handling of a thermally instable lactam at a low temperature with no fear of deteriorating the lactam.

(2) In the cooling of a lactam solution for recrystallization evaporation latent heat of liquid ammonia in itself resulted from the evaporation of the same upon partial release of the pressure, can be utilized and therefore there is no necessity of providing vacuum state for the evaporation as is normally required for the recrystallization with the use of water nor is there always a necessity of using a refrigerant such as brine.

(3) Separation of the crystal and the liquid transfer may simply be taking place owing to the difference in pressure of the two liquid containers between which the liquid is transferred with the air of the pressure of the liquid ammonia in itself or by slightly heating the liquid.

The refining process of the invention may be combined with such a known process for refining a crude lactam as alkali addition distillation extraction with the use of an organic solvent, hydrogenation or recrystallization with the use of water, and further such a process may be performed either before or after the process of the invention.

The lactams which are preferably used for the process of the invention are generally those having cyclic amidbonding having 4 to 12 carbon atoms, such as, for example, ε-caprolactam, η-capryllactam and ω-lauryllactam.

According to the invention, a crude lactam can be refined highly effectively and advantageously on an industrial scale by carrying out the operations as set forth hereinbefore. The invention will further be described hereinafter with reference to several examples in which lactams such as ε-caprolactam, η-capryllactam and ω-lauryllactam are used as being the suitable crude lactams for the process of the invention. It is, however, noted that the application of the invention is not limited only to those cases provided herein.

The solubilities of ε-caprolactam in liquid ammonia are shown in Table 1.

TABLE 1—SOLUBILITIES OF ε-CAPROLACTAM IN LIQUID AMMONIA

| Temperature (° C.) | Solubility (g./100 cc.) |
|---|---|
| −60 | 1.2 |
| −50 | 2.0 |
| −40 | 5.0 |
| −30 | 12.0 |
| −20 | 32.0 |
| −10 | 55.0 |
| 0 | 83.0 |
| 10 | 110.0 |
| 20 | 170.0 |

As can be seen in the above table, extraction of the impurities from a flaky crude ε-caprolactam is preferably performed at a low temperature at which the solubility of the lactam is low. However, it is noted that the extraction may also be performed at a relatively higher temperature with an appreciable effect. A temperature within a range between −70° C. and 0° C. is desirably used for this purpose.

In the process in which crude ε-caprolactam is dissolved in an organic solvent, with the subsequent contact with liquid ammonia, an organic solvent which has low solubility in liquid ammonia but in which the ε-caprolactam dissolves well, is preferably used for transferring the impurities to the liquid ammonia by means of the liquid-liquid extraction. This process is advantageous in that the impurities can readily be transferred at a low temperature.

Those organic solvents which are preferably used include mono-chlorobengene, xylene, ethylbenzene and mono-bromobenzene, but such other solvents which has low solubility in liquid ammonia and dissolve ε-caprolactam may also be used with a sufficiently good result.

In the case of recrystallization process, a crude lactam is first dissolved in liquid ammonia at a temperature from 0° C. to 50° C. and thereafter the solution is cooled to a temperature from −70° C. or the liquid ammonia is evaporated to recrystallize the lactam. The temperature at which the crude lactam is dissolved in liquid ammonia should not be higher than 50° C. or lower than 0° C., because in the former case, the vapor pressure of ammonia would be excessively high, while in the latter case, the lactam would not dissolve in the liquid ammonia sufficiently.

As such, the recrystallization process of the invention using liquid ammonia is distinct from the processes using other recrystallizing solvents, in which, in the invention, a sufficient refining effect can be attained even when the crystallizing percentage of ε-caprolactam is higher than 80%.

Moreover, according to the instant invention, a sufficient refining effect has been observed in each case of refining various types of lactam such as η-capryllactam and ω-lauryllactam. In the past, η-capryllactam has been refined by means of distillation, however, since the lactam cycle of the η-capryllactam is unstable, resulting in polymerization thereof at high temperature, there has been the necessity of distilling it at extremely low pressure, such as 4 mm./Hg at a temperature of 138° C. and 2 mm./Hg at a temperature of 132° C.

Such various types of lactams have a reducing solubility in water with the number of carbon atoms thereof increasing, and at the same time the solubility in liquid ammonia is also reduced.

For example, the solubilities in liquid ammonia of η-capryllactam are such as shown in the table below.

TABLE 2—SOLUBILITIES OF η-CAPRYLLACTAM IN LIQUID AMMONIA

| Temperature (° C.) | Solubility (g./100 cc.) |
|---|---|
| −37 | 3.8 |
| −18 | 10.0 |
| −2 | 20.0 |
| +23 | 55.6 |

The solubility of ω-lauryllactam in liquid ammonia is further smaller as being 5 g./100 cc. at 20° C. For such a lactam having a greater number of carbon atoms, the extraction method is more effectively used than the recrystallization method as the refining efficiency of the recrystallization method for the lactam is poor. In other words, the solubilities of lactams having a greater number of carbon atoms vary by temperature to a smaller degree than in the case of lactams having a smaller number of carbon atoms.

The unique effect of the invention will be better understood with reference to the examples set forth hereinafter. The terms for the characteristic values used in the examples are defined in the following.

*Potassium permanganate value (sec.)*

Referring to a substance to be oxidized, the value signifies a time interval, expressed by second, from the time of adding 1 cc. of N/100 KMnO$_4$ to 1% aqueous solution of lactam to the time of disappearance of the color.

*Transmittancy (%)*

The light transmittancy of 20% aqueous solution of a lactam at 280 mμ.

*Free base (meq./kg.)*

The free base contained in 1 kg. of a lactam expressed by a unit of milgram equivalent.

*Heat-resistance (%)*

The light transmittancy at 460 mμ measured after heating for 2 hours at a temperature of 200° C.

*Potassium permanganate consumption (%)*

Referring to a substance to be oxidized, the quantity of potassium permanganate converted to cyclohexanoneoxime, which was consumed for the titration of an acidic solution acidified by sulfuric acid.

*Example 1*

A crude ε-caprolactam was prepared by neutralizing a sulfuric acid solution of the ε-caprolactam obtained by subjecting cyclohexanoneoxime to the Beckmman's rearrangement with ammonia, followed by separation of the lactam layer and dehydration thereof.

200 grams of the ε-caprolactam thus prepared was formed into flaky condition and plunged into 200 cc. of liquid ammonia previously cooled to a temperature of −40° C., at room temperature. Upon agitating the solution for about 5 minutes, the liquid ammonia was blackened proving transfer of the impurities thereto. The solution was then filtered, and 185 grams of yellow ε-caprolactam crystal was obtained. The ε-caprolactam crystal was again plunged into 200 cc. of fresh liquid ammonia and the same processes as above were repeated to obtain 175 grams of light yellow lactam crystal.

This crystal was added with 4 grams of caustic soda and distilled at a reduced pressure of 10 mm./Hg whereupon 173 grams of transparent ε-caprolactam were produced. The ε-caprolactam, though it was essentially pure, was subjected to another distillation operation under a reduced pressure, as a result of which 168 grams of ε-caprolactam of high quality as shown in Table 3 below were obtained. The untreated ε-caprolactam also shown in the table is such that was distilled twice without having been subjected to the liquid ammonia treatment.

TABLE 3—COMPARISON OF CHARACTERISTIC VALUES (A)

|  | Treated ε-caprolactam | Untreated ε-caprolactam |
| --- | --- | --- |
| Potassium Permanganate Value (sec.) | 2,000 | 20 |
| Transmittancy (percent) | 65 | 36 |
| Free-base (meq./kg.) | 0.1 | 2.0 |
| Heat-Resistance (percent) | 95 | 50 |
| Potassium Permanganate Consumption (percent) | 0.05 | 0.10 |

Further the polymerization test was conducted on each of the ε-caprolactam refined according to the invention and untreated ε-caprolactam, as a result, while the polymer of the untreated ε-caprolactam was yellowish, the polymer of this invention was white and highly viscous. It was also noted that the ε-caprolactam remaining in the liquid ammonia contained much impurities and was of very poor quality. However it was recognized that ε-caprolactam could be considerably improved in its quality and recoverable by treating it in accordance with the process of the invention after having it distilled once.

*Example 2*

540 grams of crude ε-caprolactam were dissolved in 5400 cc. of monochlorobenzene, which was contacted with 4800 cc. of liquid ammonia at −40° C., agitated for 10 minutes and separated. The amount of ε-caprolactam in the monochlorobenzene layer was 486 grams, the amount of ε-caprolactam containing impurities in the liquid ammonia layer was 64 grams and the amount of monochlorobenzene was 260 cc.

The monochlorobenzene in the monochlorobenzene layer was then evaporated, followed by the alkali-addition distillation under a reduced pressure twice, and a high quality of ε-caprolactam as shown in Table 4 below in comparison with an untreated ε-caprolactam was obtained, the untreated ε-caprolactam being such that has been subjected to alkali-addition distillation twice. In the case also, the ε-caprolactam in the liquid ammonia and monochlorobenzene were recovered successfully. Upon polymerizing the ε-caprolactam obtained according to the invention, a white, highly viscous polymer was obtained.

TABLE 4—COMPARISON OF CHARACTERISTIC VALUE (B)

|  | Treated ε-caprolactam | Untreated ε-caprolactam |
| --- | --- | --- |
| Potassium Permanganate Value (sec.) | 1,500 | 15 |
| Transmittancy (percent) | 48 | 36.5 |
| Free Base (meq./kg.) | 0.1 | 2.9 |
| Heat-Resistance (percent) | 93.5 | 48.5 |
| Potassium Permanganate Consumption (percent) | 0.07 | 0.10 |

*Example 3*

A sulfuric acid solution of the ε-caprolactam obtained by subjecting cyclohexanoneoxime to the Beckmman's rearrangement was neutralized by ammonia to prepare an aqueous solution of the ε-caprolactam. The aqueous solution was then dehydrated with the subsequent alkali-addition distillation under a reduced pressure and 500 grams of yellow ε-caprolactam was produced.

The ε-caprolactam in said amount was dissolved in 500 cc. of liquid ammonia (the vapor pressure of which was 6.07 mm./Hg) at 10° C., thus obtaining a brown homogeneous solution. Upon cooling it to −10° C., white ε-caprolactam crystal was produced in the amount of 220 grams. After the separation, 1% of caustic soda was added to the ε-caprolactam crystal, which was distilled under a reduced pressure at 10 mm./Hg, and whereupon ε-caprolactam of high quality was obtained. The polymerization test also resulted in a white polymer high viscosity.

*Example 4*

100 grams of crude η-capryllactam obtained by the Beckmman's rearrangement of cyclooctanoneoxime were dissolved in 200 cc. of liquid ammonia maintained at 20° C., followed by cooling to −10° C., whereupon 71 grams of light yellow η-capryllactam crystal were produced. This was distilled at a temperature of 132° C. and under a reduced pressure of 2 mm./Hg with the yield in the amount of 65 grams. The η-capryllactam of high quality thus produced showed the potassium permanganate value of 2000 sec., potassium permanganate consumption of 0.05% and melting point 73.5° C. The polymerization test on the same resulted in a white polymer having a high viscosity.

*Example 5*

100 grams of crude ω-lauryllactam crystal prepared by the Beckmman's rearrangement of cyclodecanoneoxime were formed into flaky condition and plunged into 200 cc. of liquid ammonia maintained at 20° C., whereupon the liquid ammonia phase turned to black color. Upon filtering, 85 grams of light yellow ω-lauryllactam crystal were obtained. The obtained ω-lauryllactam crystal was recrystallized once with the use of cyclohexane, as a result of which ω-lauryllactam of high quality (the melting point being 152° C.) was produced. The polymerization test resulted in a white, highly viscous polymer.

What is claimed is:

1. A process for refining crude lactams characterized by treating a crude lactam by at least one method selected from an extracting operation and recrystallizing operation using liquid ammonia.

2. The process for refining crude lactams as described in claim 1, in that said lactam is the one selected from the group consisting of ε-caprolactam, η-capryllactam and ω-lauryllactam.

3. The process for refining crude lactam as described in claim 1, in that said lactam is the one which is obtained by subjecting oxime to the Beckmman's rearrangement.

4. The process for refining crude lactams as described in claim 3, in that said treatment with liquid ammonia is effected by means of extracting operation.

5. The process for refining crude lactams as described in claim 4, in that said extracting operation comprises contacting said crude lactam directly with liquid ammonia and extracting the impurities by liquid ammonia.

6. The process for refining crude lactams as described in claim 4, in that said extracting operation comprises dissolving said crude lactam in an organic solvent in advance, contacting it with liquid ammonia and separating the impurities by liquid-liquid extraction.

7. The process for refining crude lactams as described in claim 6, in which said organic solvent is the one selected from the group consisting of monochlorobenzene, xylene, ethylbenzene and bromobenzene.

8. The process for refining crude lactams as described in claim 4, in that said extracting operation is carried out at a temperature ranging from −70° to 0° C.

9. The process for refining crude lactams as described in claim 1, in that said treatment with liquid ammonia is carried out by means of recrystallizating operation.

10. The process for refining crude lactams as described in claim 9, in that said recrystallizating operation comprises dissolving said crude lactam at a temperature ranging from 0° to 50° C. and cooling to a temperature ranging from −70° to 0° C. to thereby recrystallize the lactam.

11. The process for refining crude lactams as described in claim 1, in that said treatment with liquid ammonia is combined with at least one method of refining crude lactam selected from the group consisting of the alkali-addition distillation, extraction with an organic solvent, hydrogenation and recrystallization using water.

References Cited
UNITED STATES PATENTS

| | | | |
|---|---|---|---|
| 2,313,026 | 3/1943 | Schlack | 260—239.3 |
| 2,462,008 | 2/1949 | Snider et al. | 260—239.3 |
| 2,988,546 | 6/1961 | Lippincott et al. | 260—239.3 |
| 3,016,375 | 1/1962 | Hopkins | 260—239.3 |
| 3,094,520 | 6/1963 | Hopkins | 260—239.3 |
| 3,145,198 | 8/1964 | Morbidelli et al. | 260—239.3 |

JOHN D. RANDOLPH, *Primary Examiner.*

WALTER A. MODANCE, *Examiner.*

ROBERT T. BOND, *Assistant Examiner.*